United States Patent [19]

Ohba

[11] Patent Number: 4,978,209
[45] Date of Patent: Dec. 18, 1990

[54] HINGE FOR SPECTACLE FRAME
[75] Inventor: Toyohiro Ohba, Yokohama, Japan
[73] Assignee: Nikon Corporation, Tokyo, Japan
[21] Appl. No.: 340,666
[22] Filed: Apr. 20, 1989
[30] Foreign Application Priority Data
  Apr. 27, 1988 [JP] Japan .............................. 63-56940[U]
[51] Int. Cl.$^5$ .............................................. G02C 5/22
[52] U.S. Cl. .................................... 351/153; 351/113; 16/228
[58] Field of Search ............... 351/111, 113, 116, 153; 16/128

[56] References Cited
U.S. PATENT DOCUMENTS
1,284,071 11/1918 Dorney .............................. 351/116
4,244,081 1/1981 Beyer et al. ........................ 16/128

Primary Examiner—Paul M. Dzierzynski
Attorney, Agent, or Firm—Shapiro and Shapiro

[57] ABSTRACT

A spectacle frame has temple members each of which can be turned around a corresponding pivot axis between a first position where the temple member is opened with respect to a front rim for use and a second position where the temple member is bent toward the front rim for storage. The frame includes a pair of hinges for connecting the corresponding temple members to said front rim. Each hinge comprises an elastic wire member and a bearing member. The wire member has a pair of arms extending from one end of the corresponding temple member substantially in parallel with a longitudinal direction of the temple member, and a pair of shaft portions each bent from a corresponding arm along the corresponding pivot axis. The bearing member, which is provided on one end of the front rim, includes a bearing portion formed along the pivot axis to receive the pair of shaft portions of the wire member, and at least one projection arranged in the path of movement of at least one of the arms of the wire member between two positions corresponding to the first and second positions of the temple member. The projection is configured to elastically deform the arm along the pivot axis during movement of the arm between the aforementioned two positions.

5 Claims, 2 Drawing Sheets

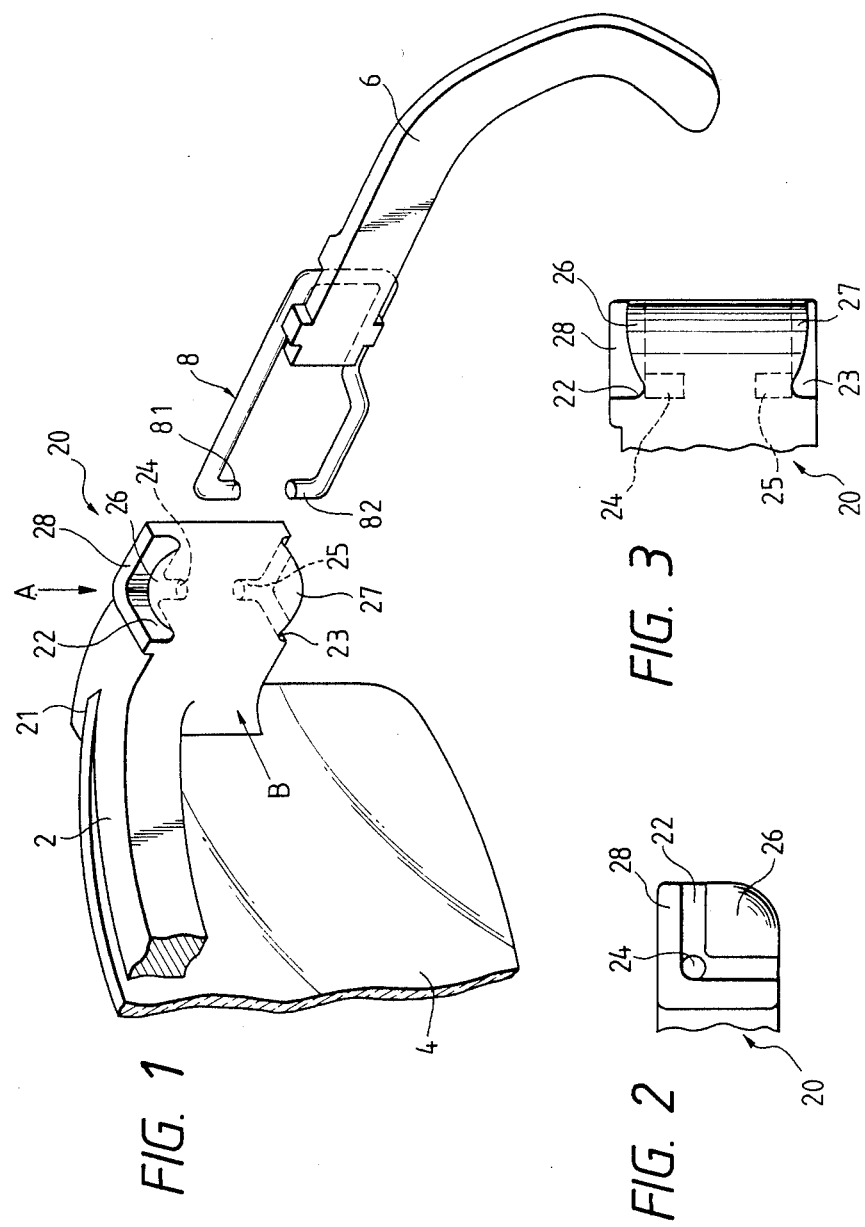

HINGE FOR SPECTACLE FRAME

BACKGROUND OF THE INVENTION

1. Field of the Invention

The present invention relates to a hinge for a spectacle frame.

2. Related Background Art

A spectacle frame having a pair of bistable spring hinges for stably holding corresponding temples of the spectacle frame in two positions, one of which is an open position where the temples are opened with respect to a front rim of the spectacle frame for use, and the other of which is a closed position where the temples are bent toward the front rim for storage, is disclosed for example, in the U.S. Pat. No. 4,244,081.

The conventional bistable spring hinge is rather complicated since it includes a coil spring for biasing the corresponding temple toward the above-mentioned two positions. Accordingly, such conventional hinge is expensive to manufacture, heavy and difficult to paint.

SUMMARY OF THE INVENTION

It is an object of the present invention to provide a spectacle frame having a pair of novel bistable hinges of simple construction.

It is an another object of the present invention to provide a spectacle frame or sunglass frame having a pair of bistable hinges which are fashionable, inexpensive and lightweighted.

The present invention provides a spectacle frame wherein each of temple members can be turned around a corresponding pivot axis between a first position where the temple member is opened with respect to a front rim for use, and a second position where the temple member is bent toward the front rim for storage. It includes a pair of hinges for connecting the corresponding temple members to the front rim, each hinge comprising an elastic wire member having a pair of arms extending from one end of the corresponding temple member substantially in parallel with a longitudinal direction of the temple member and a pair of shaft portions each bent from the corresponding arm toward the pivot axis, and a bearing member provided on one end of the front rim, the bearing member including a bearing means formed along the pivot axis to receive the pair of shaft portions of the wire member and at least one projection arranged in a moving path of at least one of the paired arms of the wire member being moved during the turning movement of the corresponding temple member between the first and second positions, and the projection abutting against said one of the paired arms to elastically deform the same along the pivot axis.

The spectacle frame according to the present invention is preferably applicable to sunglasses and sport spectacles.

BRIEF DESCRIPTION OF THE DRAWINGS

FIG. 1 is an exploded perspective view of a portion of a spectacle frame according to a preferred embodiment of the present invention;

FIG. 2 is a plan view of a portion of the spectacle frame viewed along the arrow A in FIG. 1;

FIG. 3 is a plan view of a portion of the spectacle frame viewed along the arrow B in FIG. 1;

DESCRIPTION OF THE PREFERRED EMBODIMENTS

Figure 4:
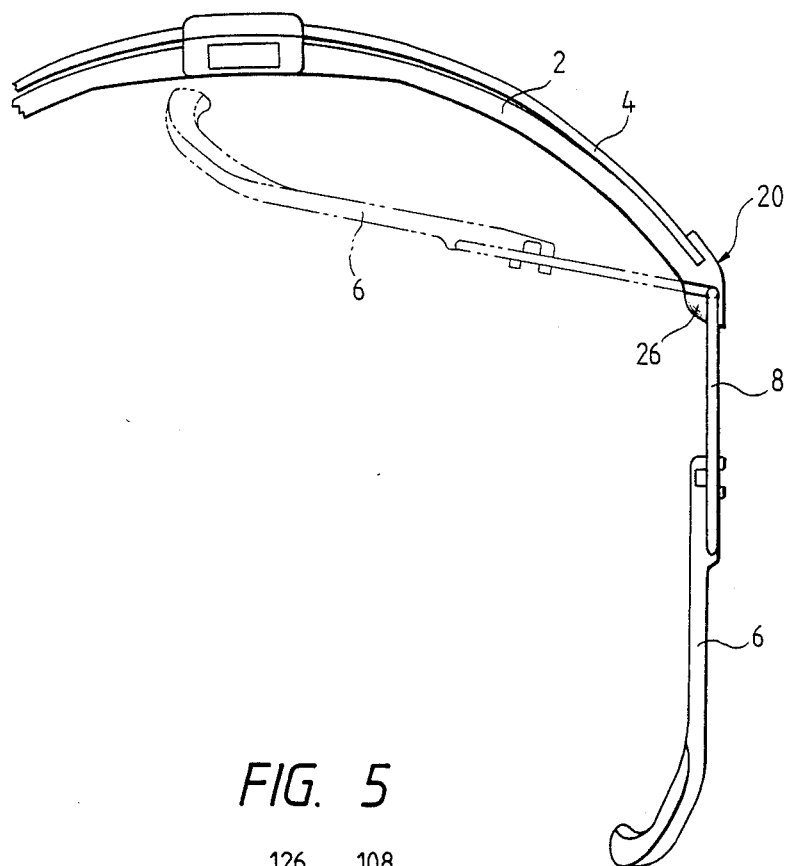
FIG. 4 is a plan view of the spectacle frame of FIG. 1.

In FIG. 1, a spectacle frame comprises a front rim 2 for holding a spectacle lens or filter 4, a pair of temples 6 (only one of which is shown in FIG. 1), and a pair of hinges for connecting the corresponding temples 6 to the front rim 2. Each hinge is constituted by a bearing member 20 fixed to the front rim 2 and a shaft member 8 fixed to the corresponding temple 6.

Preferably, to facilitate production, minimize weight and reduce cost of the spectacle frame, the bearing member 20, is made of plastic material such as cellulose nitrate (celluloid), cellulose acetate, cellulose propionate, cellulose butylate and the like, or polyamide material such as 6-nylon, 6, 6-nylon, 12-nylon, ABS, AS resin, high density polyethylene, polypropylene, polyacetal, polycarbonate, polyethylene terephthalate, polybutylene terephthalate, PPS, denatured polyphenylene oxide, epoxy resin, unsaturated polyester, polymethyl pentene and the like. However, the bearing member may be made of metallic material in place of such plastic material.

The bearing member 20 can be formed integrally with the front rim 2, as in the illustrated embodiment. Of course, the bearing member may be independent from the front rim and then be fixedly attached to the front rim.

The spectacle lens 4 is fixedly mounted on the rim 2 by fitting it into a slot 21 formed in the front rim 2.

As shown in FIGS. 2 and 3, substantially L-shaped recesses 22 and 23 are formed in upper and lower surfaces of the bearing member 20, respectively, and inwardly extending bearing holes 24 and 25 are formed at the corners of the L-shape in the upper and lower recesses 22 and 23, respectively. One leg of each L-shaped recess 22 and 23 extends along the longitudinal direction of the corresponding temple 6 when the temple is positioned in an open position for use, and the other leg of the L-shaped recess extends along the longitudinal direction of the temple 6 when the temple is bent toward the front rim to a closed position for storage. Projections 26 and 27 each having a relatively gentle slope are formed on the upper and lower surfaces of the bearing member between the L-shaped legs of the recesses 22, 23, respectively.

The shaft member 8 comprises a wire member having a circular cross-section and made of metal such as stainless steel, bronze phosphide and the like or synthetic resin having strong spring characteristic, and is configured to form a substantially U-shape. The shaft member is fixedly or removably mounted on the temple 6. A pair of arms of the U-shaped shaft member 8 are provided at their free ends with inwardly bent shaft portions 81 and 82, respectively, which constitute a pivot axis for the temple and which are rotatably fitted into the bearing holes 24 and 25, respectively. It is preferable that the configuration of cross-section of the paired arms of the shaft member 8 is substantially complementary to that of the corresponding L-shaped recesses 22, 23.

Upstanding walls 28 formed on the upper and lower surfaces of the bearing member 20 along outer peripheries of the L-shaped recesses 22, 23, respectively, serve as stoppers for limiting the turning movement of the shaft member 8. Accordingly, the shaft member 8 can be turned or rotated around the pivot axis (constituted by the shaft portions 81, 82 arranged in the bearing holes) through about 90°.

With such construction, each hinge can be assembled by spreading the arms (i.e., widening the distance between the shaft portions 81, 82) by spreading the arms of the shaft member 8 apart and by inserting the shaft portions 81 and 82 into the corresponding bearing holes 24 and 25 of the bearing member 8, respectively. The arms of shaft member 8 can be spread apart repeatedly due to the spring characteristic or elasticity thereof, and tend to return to their original configuration. Therefore, if the shaft member 8 is so designed that the original distance between the shaft portions 81, 82 is sufficiently smaller than a distance between an entrance opening of the upper bearing hole 24 and an entrance opening of the lower bearing hole 25, the shaft member 8 will not easily be slipped out of the bearing member once the shaft portions 81, 82 have been inserted into the corresponding bearing holes 24, 25, due to the fact that the shaft member 8 resiliently clamps the bearing member 20 from both upper and lower sides. Further, there is no play between the each temple 6 and the front rim 2.

When the shaft portion 8 is inserted into the bearing member 20, the shaft portion 8 and accordingly by the temple 6 can be rotated in the bearing holes through about 90° between the open position where the temple 6 is cocked with respect to the front rim 2 (for use,) as shown by a solid line in FIG. 4, and the closed position where the temple 6 is bent or overlapped with respect to the front rim 2 (for storage,) as shown by a phantom line in FIG. 4. In use, each arm of the shaft member 8 is held in the leg portion of the associated L-shaped recess 22 or 23 corresponding to the open position, so as the shaft member 8 in a first stable condition. Also, in the storage or unused condition, each arm of the shaft member 8 is held in the other leg portion of the associated L-shaped recesses 22 or 23, so as to maintain the shaft member 8 in a second stable condition.

When the temple 6 is rotated from the in use-condition to the storage condition or vice versa, the paired arms of the shaft member 8 climb or ride up the gentle slopes on one side of the corresponding projections 6, 27 (positioned between the legs of the corresponding L-shaped recesses) while being spread apart. Upon reaching the tops of the projections, the paired arms of the shaft member 8 automatically descend along the gentle slopes on the other side of the corresponding projections 26, 27 (due to the spring force of the arms) to reach and then be fitted into the other leg portions of the corresponding L-shaped recesses 22, 23, thus providing the stable condition.

Incidentally, the bearing holes formed in the bearing member 20 may be comprised of a through hole, in place of the blind holes shown in the illustrated embodiment. Further, in order to obtain bistable function of the hinge, the projection need not necessarily be formed on both of the upper and lower surfaces of the bearing member, but may be formed on either the upper or lower surface only.

Figure 5:
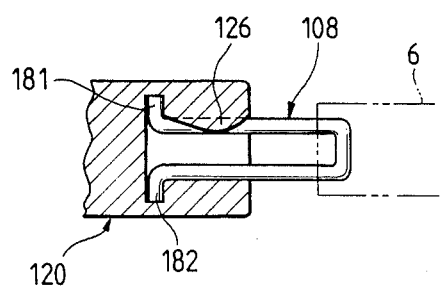
FIG. 5 is a sectional view showing an alteration of a hinge of the spectacle frame.

Further, an alteration shown in FIG. 5 may be used. In this alteration, the bearing member 120 has a cavity into which the shaft member 108 is inserted and which includes outwardly extending bearing holes (not numbered) formed in the bottom thereof into which a pair of outwardly bent shaft portions 181 and 182 of the shaft member 108 can be inserted. The cavity further includes a projection 26 having the same function as that of the aforementioned projections 26 and 27. Of course, the shaft member is attached to the temple 6.

I claim:

1. In a spectacle frame having a front rim with two opposite end portions and, at each said end portion, a respective temple member connected to said front rim by a corresponding hinge for pivotal movement about a corresponding pivot axis between an open position where said temple member extend rearwardly with respect to said front rim for use and a closed position where said temple member extends along said front rim for storage, the improvement wherein said hinge comprises:

an elastic wire member having a pair of arms extending substantially longitudinally of said temple member and attached to said temple member for movement therewith about said pivot axis between two positions respectively corresponding to said open position and said closed position of said temple member, each arm having a shaft portion bent therefrom along said pivot axis, and a bearing member provided on the corresponding end portion of said front rim, said bearing member including bearing means formed along said pivot axis to receive said shaft portion of each arm, and projection means arranged in a path of movement of at least one of said arms between said two positions for abutting said one arm and elastically deforming said one arm along said pivot axis during movement of said one arm from each of said two positions to the other.

2. The improvement of claim 1, wherein said projection means includes a first slope surface arranged for contacting with said one arm to elastically deform the same in a predetermined direction along said pivot axis during movement of said one arm from one of said two positions to the other, and a second slope surface arranged for contacting with said one arm to elastically deform the same in said predetermined direction during movement of said one arm from said other position to said one position.

3. The improvement of claim 1, wherein each said shaft portion of said elastic wire member is bent in an opposite direction from the other.

4. The improvement of claim 1, wherein said bearing member has a pair of L-shaped recesses each including a pair of leg portions into one of which a corresponding one of said arms inserts when said temple member is in said open position, and into the other of which said corresponding arm inserts when said temple member is in said closed position, and wherein said bearing means has portions positioned at respective corners of said L-shaped recesses.

5. The improvement of claim 4, wherein said bearing member further includes wall means along an outer periphery of each of said L-shaped recesses for limiting movement of the corresponding arms.

* * * * *